United States Patent

Barr et al.

[11] 4,058,133
[45] Nov. 15, 1977

[54] SELF-CONTAINED TENT ASSEMBLY

[76] Inventors: Dwight L. Barr, 10711 Kariuto Court, San Diego, Calif. 92124; Leslie A. Barr, 6205 Crystal Lake Ave., San Diego, Calif. 92119

[21] Appl. No.: 655,210

[22] Filed: Feb. 4, 1976

[51] Int. Cl.² .............................................. B60D 3/32
[52] U.S. Cl. ................................ 135/4 A; 296/23 MC
[58] Field of Search ................ 135/1 A, 4 A, 15 CF; 296/23 A, 23 F, 23 MC

[56] References Cited

U.S. PATENT DOCUMENTS

| | | | |
|---|---|---|---|
| 2,811,725 | 11/1957 | Cence | 135/4 A |
| 2,930,051 | 3/1960 | Kampmeier | 135/4 A |
| 3,093,150 | 6/1963 | Schaftener et al. | 135/1 A |
| 3,623,762 | 11/1971 | Fagan | 296/23 MC |
| 3,712,315 | 1/1973 | Franzen | 135/4 A X |
| 3,712,316 | 1/1973 | Leonard | 135/4 A X |
| 3,742,966 | 7/1963 | Franzen | 135/4 A X |
| 3,875,953 | 4/1975 | Couix | 135/4 A |
| 3,917,337 | 11/1975 | Couix | 135/4 A X |

*Primary Examiner*—Werner H. Schroeder
*Assistant Examiner*—Conrad L. Berman
*Attorney, Agent, or Firm*—Brown & Martin

[57] ABSTRACT

A car-top tent assembly comprises a pair of hinged half shells which mate together in suitcase fashion for travelling, one of these half shells being mounted to the vehicle and the other folding out into alignment with the first to form a bed complete with mattress for overnight stops, there being a tent structure secured to the half-shell edges which erects automatically upon opening of the halves.

22 Claims, 16 Drawing Figures

SELF-CONTAINED TENT ASSEMBLY

BACKGROUND OF THE INVENTION

The widespread popularity of camping has, in recent years, spawned the development of a spectacular variety of campers, trailers, and car-top fixtures which pop up, fold out, or swing down to form many kinds of structures performing a number of different functions. Among these is a fold-out tent having a built-in bed which is disclosed in U.S. Pat. No. 2,930,051 and approaches in some ways the concept of the present invention.

However, car-top sleeping facilities, despite numerous inventions, have not been widely used, perhaps for several reasons. The full-length bed is cumbersome during transport and when mounted on the short, curved roof lines of todays vehicles, requires a relatively elaborate support structure for each type of auto style. Further, protective weather covers, which are are rigid, are large, and when detached or prepared for sleeping or transport, are difficult and often dangerous to handle from the operator's ground level position.

There is a need for a completely self-contained car-top tent assembly which is as compact and lightweight as possible to permit the carrying thereof even on the smaller compacts, and which provides in the simplest and most easily operable form the basic requirements of bedding and shelter for either overnight road stops or extended camping.

SUMMARY OF THE INVENTION

The present invention fulfills the abovementioned need and comprises a pair of hinged half shells which are horizontally mounted on a vehicle and mate to define a compact suitcase-like enclosure when travelling, and when stopping for the night the upper half-shell is released from the lower half-shell and swings up and out laterally to form an extended bed of sufficient length to sleep one or more persons. A tent structure secured to the edges of the half-shell and to pivotal U-shaped tent bow braces is raised automatically to a taut position as the half-shells are opened, and a mattress attached to the half-shells, along with appropriate bedding, unfolds with the half shells so that, in essentially a single motion, the structure is converted from a top carrier into a car-top tent complete with bedding.

DETAILED DESCRIPTION OF THE PREFERRED EMBODIMENT

Figure 1:
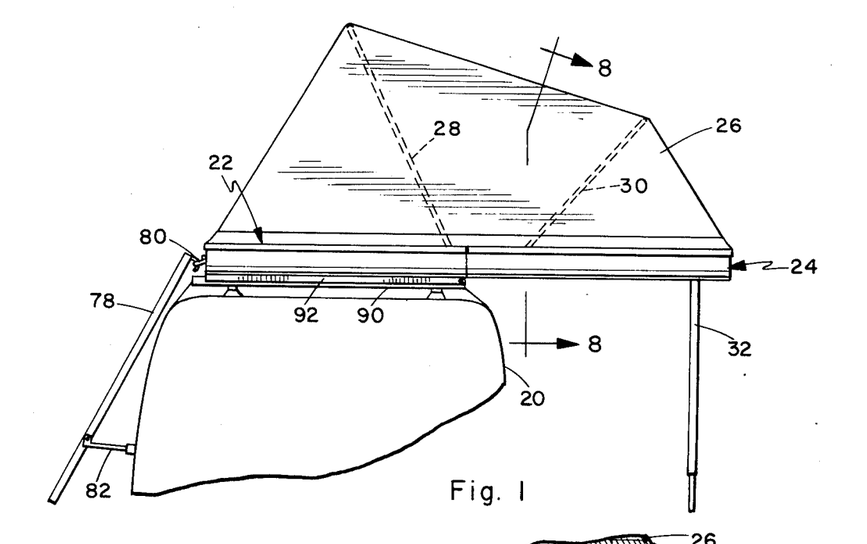
FIG. 1 is a side elevation view of the tent erected on a vehicle.
Figures 9, 10:
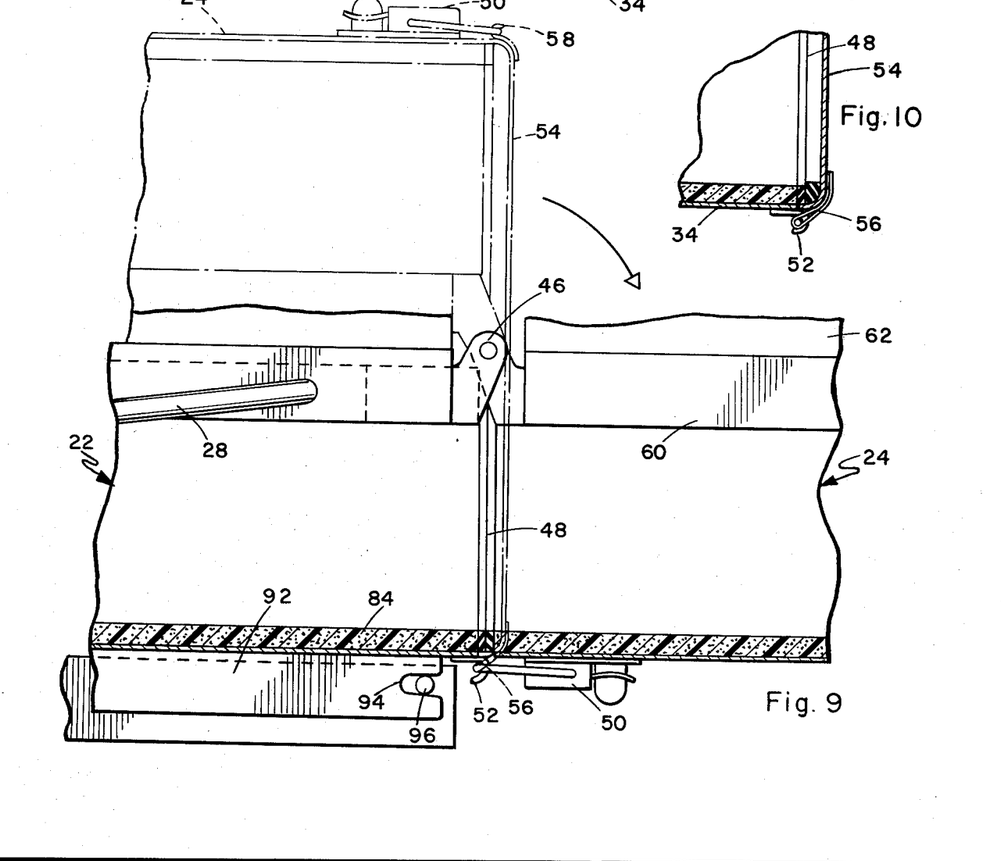
FIG. 9 is an enlarged section view taken on line 9—9 of FIG. 6.
FIG. 10 is a sectional view similar to a portion of FIG. 9, showing the end cover attachment on the closed unit.

The tent apparatus, shown mounted atop a vehicle 20 in FIG. 1, includes a first half-shell 22 which is attached to the vehicle top and a second half-shell 24 which is hinged to the first half-shell as is detailed in FIG. 9. The tent structure itself comprises a sheet of canvas or other suitable material 26 which is attached along the perimeters of the half-shells and is automatically erected upon the unfolding of the half shells by a pair of U-shaped tent bow support rods 28 and 30 which are journalled in the respective half-shells at their lower extremities and are attached along their upper spanner portions to the tent fabric. These support rods could alternatively be journalled at the axis of the half-shells. The structure is intended to be mounted atop a vehicle such that it opens laterally to one side thereof, as shown in FIG. 1, and a telescopic leg 32 is used to support the extended half shell above the ground.

The half shells are of almost identical construction and each comprises a skin 34 which could be of aluminum and which is flat along the bottom and curved upwardly at 36 along the sides, the outer ends of the half-shells having vertical end walls 38.

Figure 8:
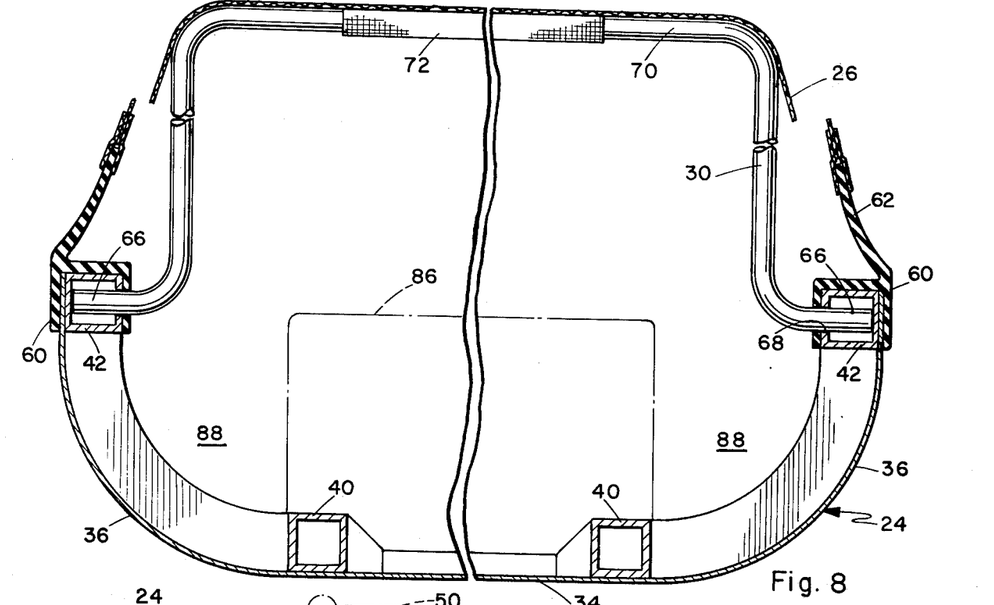
FIG. 8 is an enlarged sectional view taken on line 8—8 of FIG. 1.

The skin of each half-shell can be pressed as a single piece and is reinforced with floor support beams 40 which are squared in cross section and extend along the flat portion of the skins near the sides. This structure is best seen in FIG. 8, which also discloses a second pair of support beams 42 which run parallel to the first and are attached to the upper edges of the curved side 36 of the aluminum skin. Support for the end walls 38 is provided by a third set of beams 44, which follow the lateral contour of the half-shell bottoms and are fastened to the aluminum skin as well as the respective end walls. A pair of straight end beams 45 span the upper edges of the end walls. This particular beam arrangement is, of course, subject to modification, but represents a construction of high strength-to-weight ratio to facilitate handling and minimize top-heaviness of the supporting vehicle.

The inner ends of the half-shells, that is, the ends opposite the outer end walls 38, are pivoted together by a pair of hinges 46, which are connected to the inner ends of the beams 42 of the respective half-shells. It can be seen that when the half-shells are swung together to achieve the mated relationship of FIG. 7, also partially shown in phantom in FIG. 9, the end walls 38 will come together and that the inner ends 48 of the half-shells, when the half-shells are mated, will define the only open area of the otherwise enclosed, suitcase-like container. To enclose this area, the second half-shell 24 is provided with a latch 50, and the first half-shell 22 is provided with a hook 52, and an end panel 54 is utilized having a loop 56 at one end and a hook 58 at the other end so that the panel may be looped onto the hook 52, swung up into tight sealing relation and latched in that position by the latch 50, as shown in phantom in FIG. 9. When unfolding the half-shells into extended position, as shown by the arrow in FIG. 9, this end panel is first removed and when the half-shells are in extended alignment the latch 50 is used to directly engage the hook 52 holding the two half-shells in rigid alignment.

Figures 2, 3, 4:
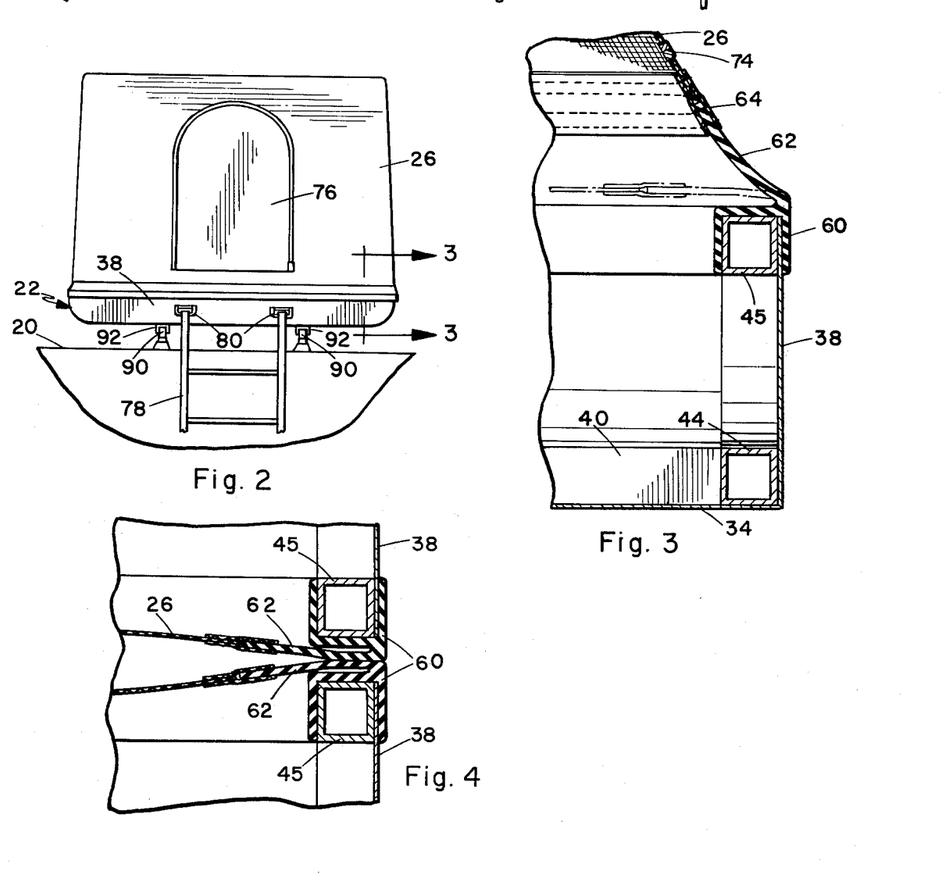
FIG. 2 is a front view of the erected tent.
FIG. 3 is an enlarged sectional view taken on line 3—3 of FIG. 2.
FIG. 4 is a sectional view similar to FIG. 3, but with the structure closed to show the sealing action.

Turning again to FIG. 8, and with reference also to FIGS. 3 and 4, the beams 42 and 45 which form the peripheral support for the half-shells are capped by a sleeve 60 around the entire perimeter of the half-shells when extended. This sleeve is made of a waterproof, resilient material such as neoprene and is attached to the upper edges of the half-shells, and is provided with a flap 62 which is inwardly directed, as shown in FIG. 4, when the sleeve and flap structure is molded so that the flap has an inward bias. The sleeve and flap structure has a three-fold purpose, the first being to provide a tight gasket seal, as indicated at FIG. 4, between the walls of the half-shells when they are mated. Secondly, the edges of the canvas sheet 26 are joined to the flap along seams 64 to weatherproof the assembly when erected, and finally, the tent material is biased inwardly at its edges by the flap, so that it collapses nicely within the half-shells as they are closed, rather than overlapping the edges.

The support 30, as shown in FIG. 8, has two outwardly bent ends 66 which are inserted through holes 68 in the beams 42 in the covering sleeves, the rod being held in journalled relationship in the beams by its own tension or by a locking mechanism and being capable of removal by compressing the legs together. The upper spanner portion 70 engages a sleeve attachment 72 so that the spanner portion moves with the fabric as the half-shells are opened to automatically erect the tent. The tent fabric has a continuous zipper 74 or other fastening means around its lower reaches so that the entire tent structure may be removed from the half-shells, the support 30 being removable therewith by disengaging same from the beams. The other support rod 28, which is mounted to the half-shell 22 and to the tent fabric in a fashion similar to rod 30, in likewise removable. These support rods could also be pivoted at the axis of the mating half-shells, or as illustrated in the embodiment shown in FIGS. 13–16.

The front of the tent, which would normally be above the driver's side of the vehicle, has an entryway therein covered with a zippered flap 75, access being provided to the doorway by means of a ladder 78 which hooks into the lower half-shell, such as at the handles 80, and is braced is spaced relation from the vehicle side by a pair of pivotally connected legs 82. The ladder is small enough to be easily contained within the half-shells when they are mated after the legs 82 have been collapsed.

Figures 11, 12:
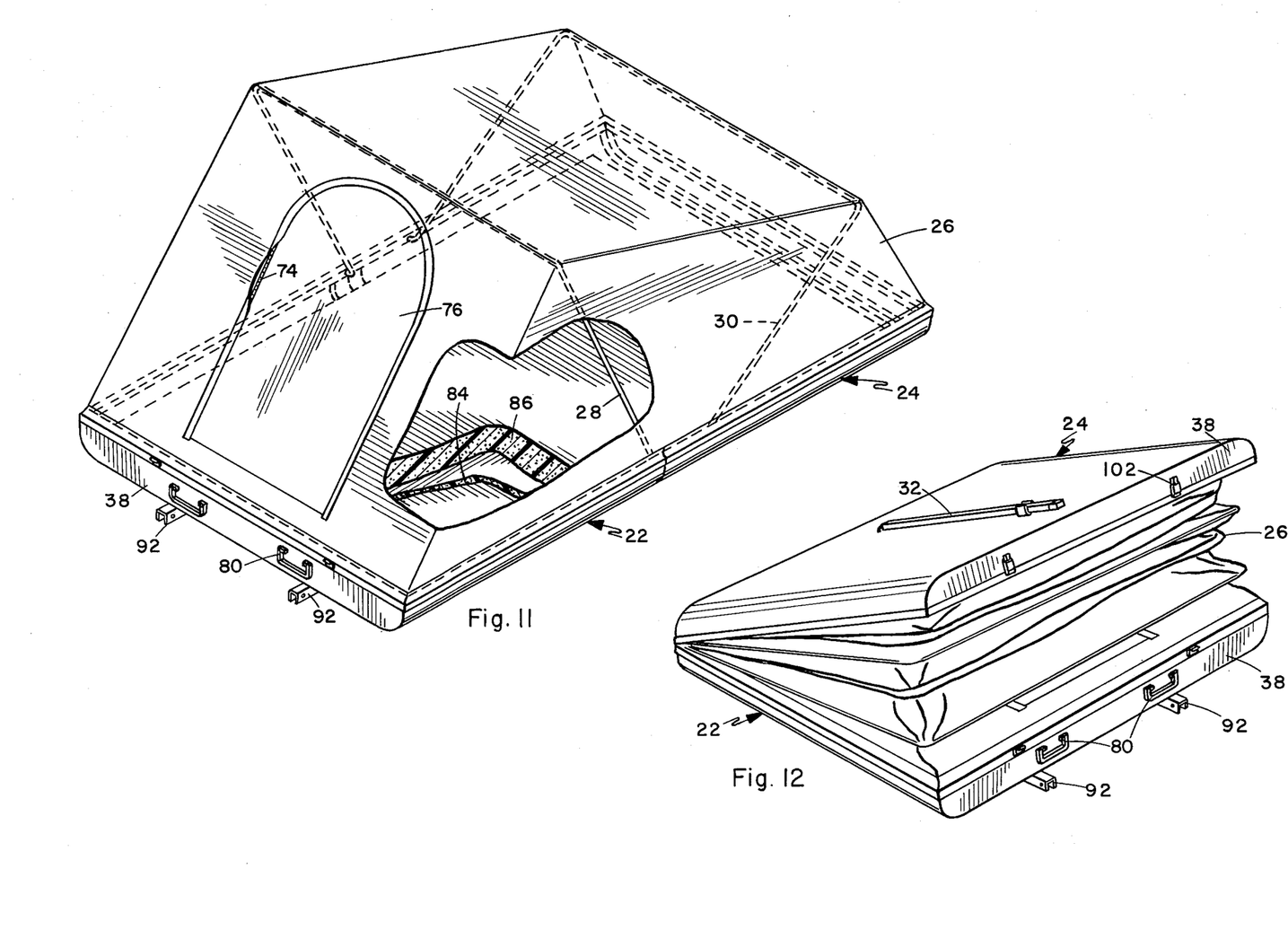
FIG. 11 is a perspective view, with a portion cut away, of the erected structure.
FIG. 12 is a perspective view of the unit in nearclosed position.

Turning again to the interior of the half-shells in their extended position, as illustrated in FIG. 11, the flat portions of the aluminum skin which form an extended platform in this configuration are covered with a stiff foam material 84 for additional support, this foam terminating at the abutting ends of the respective half-shells to permit folding. Above the stiff foam is a layer roughly three inches thick of soft foam 86 which is continuous over the length of the platform defined by the half-shells and bends in the middle when they are mated. This foam may be attached to the structure in any convenient fashion, such as by hook and loop fasteners near the ends of the foam, this arrangement having the advantage that bed clothes on the foam could be neatly tucked therearound at each end so that a ready-made bed would be available upon opening the half-shells. The soft foam mattress terminates short of the sidewalls and ends of the half-shells so that pockets 88 remain along edges of the mattress to provide elbow room to the users and also define spaces in which the sidewalls of the tent fabric and the support rods may seat when the half-shells are mated.

The apparatus is secured to the roof of a vehicle in such a way that it may be quickly and easily removed and reinstalled from the driver's side by one person. A pair of conventional lateral top carrier supports 90, shown in FIG. 1 as being of the suction cup type, but perhaps, preferably, being of the steel bar type which engage in the vehicle rain gutters, are first mounted to the car in properly spaced relation. The half-shell 22 has a pair of parallel tracks 92 mounted to the underside thereof, the right ends of these tracks as viewed in FIGS. 1 and 9, being provided with slots 94 which engage pegs 96 which are installed in the support 90. The other ends of the support are provided with bores and have pins 98 suspended by chains from the supports such that the pins may be engaged through the bores in the support and complementary bores in the tracks 92 to rapidly secure the structure to the carrier support.

The optional handles 80 have projections 100 which prevent the handles from being raised beyond the approximately horizontal position so that an operator trying to remove the structure from the driver's side will not have his hands pinched by the handles. It can thus be seen that removal of the tent apparatus in its mated configuration is easily accomplished from the driver's side by simply pulling the pins 98 and sliding the structure off of the carrier supports or carriage bars. The reverse of this procedure, of course, results in the simple installation of the unit.

Figure 5:
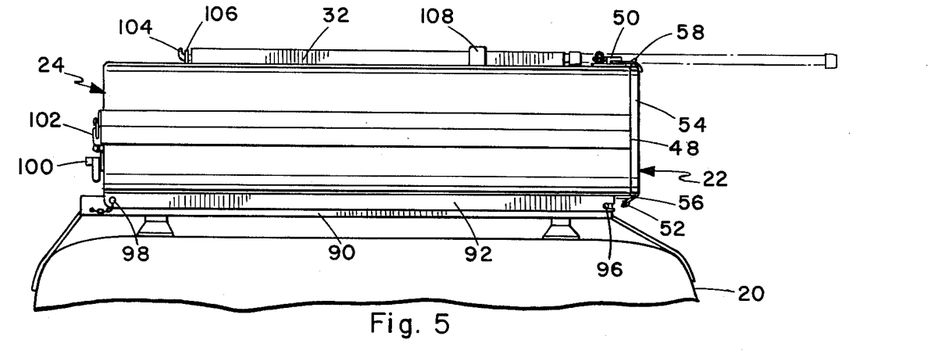
FIG. 5 is a side elevation view of the closed unit.
Figure 6:
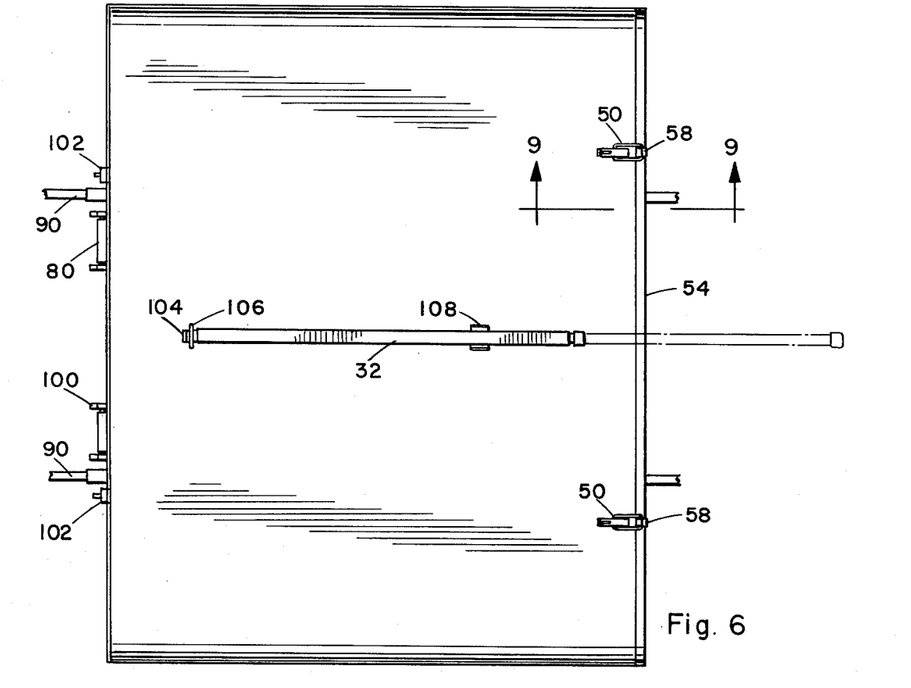
FIG. 6 is a top plan view of the closed unit.
Figure 7:
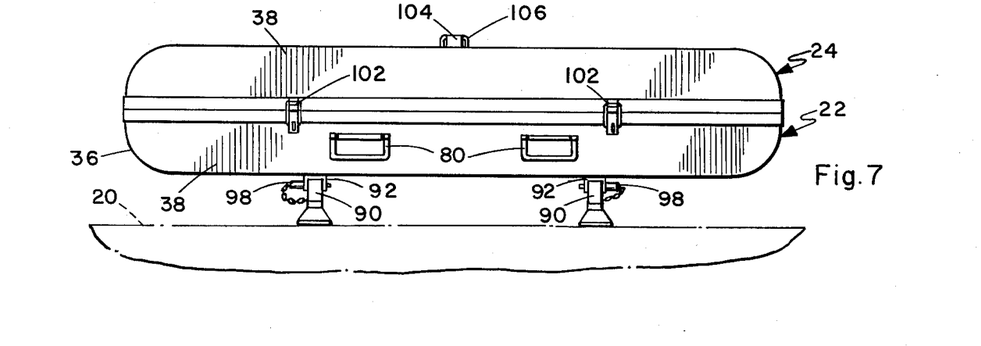
FIG. 7 is a view as taken from the left hand side of FIG. 5.

When the two half-shells are mated together for transport, they are held together by a pair of common lever-type latches 102 which can best be seen in FIGS. 5–7. In order to open the structure for use at an overnight stop, first the end panel 54 is removed from the hinged ends of the half-shells as previously described and then the latches 102 are released, permitting the upper half-shell 24 to be swung open and into alignment with the lower half-shell, as shown in FIGS. 1 and 11. Simultaneously, the tent fabric 26 is opened into erect position on the support rods 28 and 30 and the inner ends of the half-shells fall into abutment. At this point, the bottom of the half-shells define an extended platform and the soft foam mattress together with any bed clothes disposed thereon are extended into full sleeping length.

It has been found that, even though half of the structure overhangs the right hand side of the car, the tent fabric together with the abutting ends of the half-shells will fully support the overhanging half-shell, but for additional safety, which would likely be essential in a less expensive embodiment, the telescoping support brace 32 is added to half-shell 24. This brace is attached by any desired means, shown as a hook 104 which engages an eye 106 on the second half-shell, but this attachment could be by ball and socket or other means. A clip 108 is provided spaced from the hook and eye to maintain the brace in fold-down position for travelling, as shown in FIGS. 5–7 and 12. This brace has a telescopic portion 110, shown extended in phantom in FIGS. 5 and 6, and includes any suitable means of locking the telescopic portions to the desired length to support the second half-shell above the ground, as shown in FIG. 1.

The telescopic support brace is also instrumental in swinging the half-shell into position, which would otherwise be difficult for one person. To accomplish this, the telescopic portion of the brace is extended while the half-shells are mated, as shown in FIGS. 5 and 6, so that the user can use the brace as a lever to open the half-shells. After the half-shells are opened, the user simply pivots the brace out and adjusts it to the proper height to support the second half-shell. The brace, as shown, telescopes to a small enough length to be contained within the closed half-shells, and it is removable as shown for this purpose.

A modification of the invention is illustrated in FIGS. 13-16, which is rather diagrammatically illustrated, and embodies substantially the same construction details as the previously described embodiment. An important feature of this embodiment is that it utilizes three tent bow rods as opposed to two. A pair of rearward rods 110 and 112 are pivotally attached to the axis points of the half-shells to support the rear portion of the fabric 26, and as can be visualized these rods erect automatically upon opening the structure. The third rod 114 supports the front of the tent structure around the entryway and is made rigid when erected by a pair of brace arms 116 which are pivotally attached to the side members of the support rod 114 and slide in tracks at their other ends in the sidewalls of the half-shell 22. These braces have a detent position in their tracks to rigidly support the front of the tent is erected position.

Figure 14:
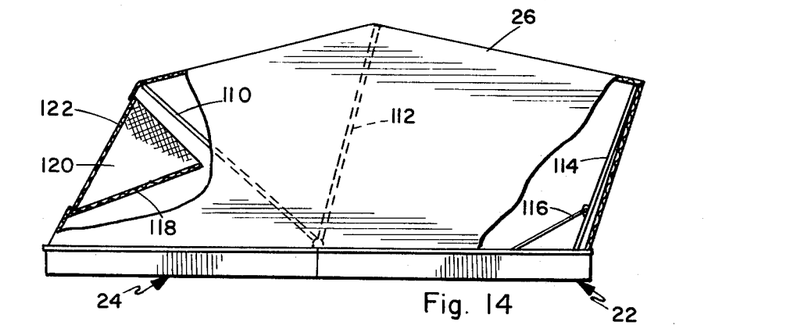
FIG. 14 is a side elevation view, partially cut away, of the structure of FIG. 13.

As can be seen by the dotted line of FIG. 14, which indicates the travel path of the tent bow between the open and the closed position, this bow is rearwardly pivoted to nest within the half-shell 22 when the structure is closed. Utilization of the third bow permits the entryway plane of the tent to be forwardly inclined, as can be seen in FIG. 14, to prohibit the ingress of water during rainstorms. It would be possible to leave the entryway open for ventilation during rain if the wind is light. An entryway weatherproofing and privacy flap and insect screen may be provided, each with a means of being opened or closed, either from within or external to the erected tent.

Another feature of the invention, similarly designed to enhance ventilation during rain, comprises a rain flap 118 including flexible sidewalls 120 which surround the lower and side edges of a screened window opening 122, best seen in FIG. 14. Because of the angle assumed by the rain flap, it acts as a gutter which drains any water which falls through the screen. Means to close the flap against the screen for complete weatherproofing and light may be provided.

Figure 16:
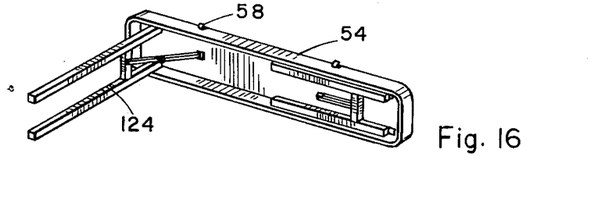
FIG. 16 is a perspective view of the removable end cover with foldable legs installed for use as a seat.

An end panel 54 is illustrated in FIG. 16, which could be utilized in either of the formerly presented embodiments and is essentially similar to that already shown, except that folding leg structure 124 is incorporated on the inner side of the panel so that it may be used as a bench or table when the tent is erected. Clearly legs 124 are dimensioned to fit flush against the end panel and the illustrated collapsible brace means rigidifies the legs when extended. The means of attachment to the half-shells, comprising in part the hooks 58, is similar to the means already described.

Figure 15:
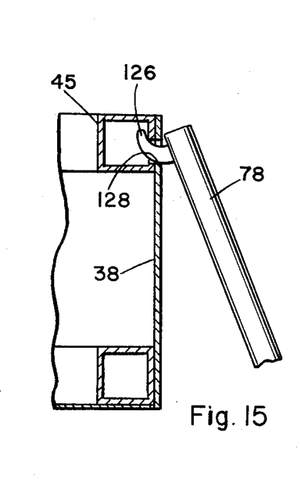
FIG. 15 is a sectional view similar to a portion of FIG. 3, showing an alternative ladder attachment.

Another slight modification is illustrated in FIG. 15 wherein the ladder 78, as opposed to hooking into carrying handles on the half-shell 22, is provided at the upper ends of a parallel support with hooked protuberances 126, which engage in holes 128, such that insertion of these hooks can be effected when the ladder is extended somewhat away from the side of the vehicle, and upon the ladder being permitted to rest against the side of the vehicle the hooks are firmly secured in the half-shell 22.

Figure 13:
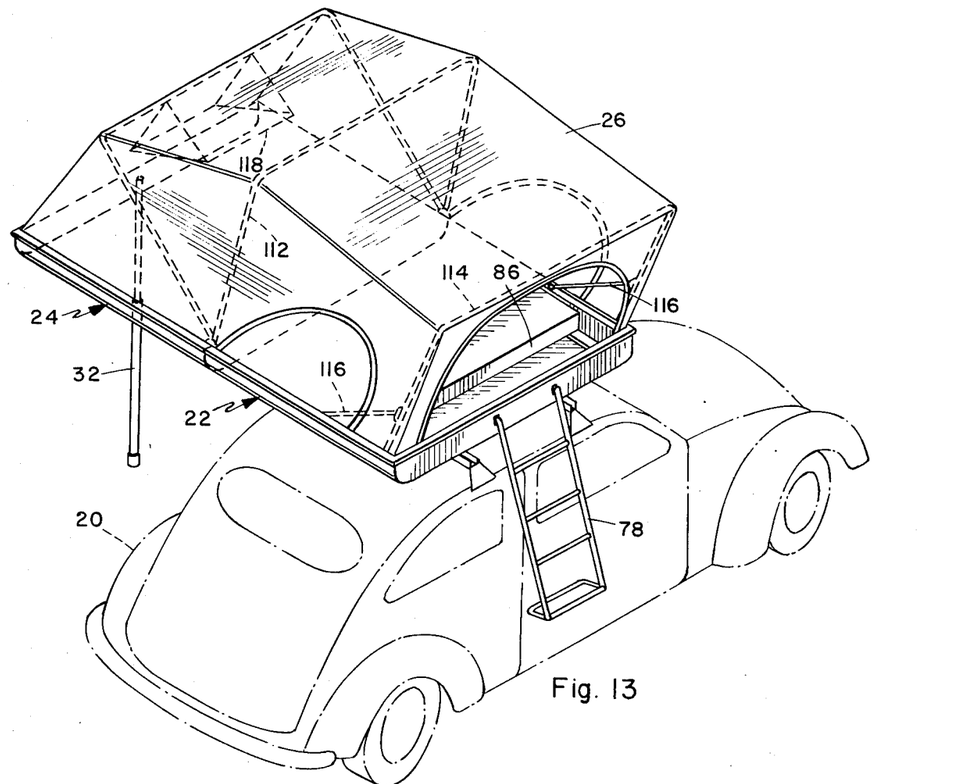
FIG. 13 is a perspective view of a modified form of the unit erected on a vehicle.

It will also be noted that the embodiment as illustrated in FIG. 13 opens to the side of the vehicle opposite the driver. The structure could, of course, be reversed to open on the driver's side, as described in the previous embodiment.

The structure as described above is easily removable and installable on the roof of a motor vehicle and due to its lateral attachment relative to the vehicle body can be installed on almost any vehicle having a hard roof regardless of vehicle size. Erecting the tent and extending the bed inside is equally simple, and the unit has the additional versatility of being removable from the vehicle top for use as a tent and bed on the ground, in a truck bed, boat, or anywhere else, and if it is desired the canvas and the supports therefor can be completely removed from the half-shells and the bedding foam 86 also removed, so that a conventional top carrier is provided.

It would also, of course, be possible to provide the structure with a separate canvas cover if additional protection from the elements is desired during transit, and the half-shells of the unit could be easily constructed of plywood, fiberglass, plastic or the like, although some durability and weight advantage would be lost. Other minor modifications could clearly be made within the scope of the invention described above and claimed hereinafter.

I claim:
1. A self-contained tent assembly comprising:
first and second half-shells hinged together at their respective inner ends and capable of folding together in mating relation for defining an enclosure and extendable into aligned relation for defining a planar platform;
a flexible sheet attached to the peripheries of said half-shells when same are mated and for defining an enclosed space above said platform when said half-shells are extended;
support means for folding within said half-shells when same are mated and for supporting said sheet above said platform when sad half-shells are extended;
said half-shells including upwardly extending walls which completely surround said platform when said half-shells are extended; and
an impermeable resilient flap having base means mounted along and sealingly encompassing the upper edges of said walls, and said flap being inwardly directed, said sheet being attached to the inner edge of said flap so that upon folding said half-shells into mating relation, said flexible sheet will be inwardly biased by said flap to fall within said sidewalls and said flap on each half-shell will engage the flap at the other half-shell for defining seal means for sealing said half-shells in the closed position.

2. Structure according to claim 1 wherein said flexible sheet is removeably attached to said flap.

3. Structure according to claim 1 and including a mattress mounted to the interior of both of said half-shells, said mattress being foldable centrally when said half-shells are mated to reside within the confines of the enclosure defined thereby and extended full-length automatically upon extending said half-shells.

4. Structure according to claim 1 wherein said support means includes a pair of inverted generally U-shaped rods pivotally attached to the hinge points of said half-shells, each of said rods having a spanner portion engaged in one of a pair of sheathes defined by said flexible sheet such that said rods are automatically erected upon opening said half-shells.

5. Structure according to claim 1 wherein said support means includes rigid generally U-shaped rods having the ends thereof journalled in one of said half-shells such that said rod is free to swing about an axis substantially coaxial with the hinge axis between said half-shells, at least a portion of said rod being attached to a portion of said sheet so that the extension of said half-shells from the mated position automatically effects the erection of said sheet to define an enclosed space above said platform.

6. Structure according to claim 5 and including two rigid, generally U-shaped rods each being journalled in respective ones of said half-shells and attached to portions of said sheet.

7. Structure according to claim 1 wherein each of said half-shells includes a pair of sidewalls, the inner ends of the sidewalls of one half-shell abutting the inner ends of the sidewalls of the other half-shell when said half-shells are extended to define a pair of composite sidewalls extending the length of said platform, said half-shells being connected by hinges joining the tops of the abutting inner ends of the sidewalls.

8. A tent assembly according to claim 7 wherein said flexible sheet defines an entry way when erected and said support means include an inverted U-shaped rod pivotally mounted at the extremities thereof to one of said half-shells and being pivotal from a position laying within one of said half-shells to a position supporting said entryway in a position inclined and overhanging said entryway and beyond the outer edge, said one half-shell for sheltering and minimizing the entry of rain through said entryway.

9. A self-contained tent assembly comprising:
first and second half-shells hinged together at their respective inner ends and capable of folding together in mating relation for defining an enclosure and extendably into aligned relation for defining a planar platform;
a flexible sheet attached to the peripheries of said half-shells, said sheet being shaped and dimensioned to fold within said half-shells when same are mated and for defining an enclosed space above said platform when said half-shells are extended;
support means attached to said half-shells for folding within said half-shells when same are mated and for supporting said sheet above said platform when said half-shells are extended;
said flexible sheet including inclined portion which defines a screened opening, and trough-defining flap means attached to the inside of said flexible sheet along the lower edge of said opening for providing a watershed for draining any water entering the tent assembly through said screened opening.

10. Structure according to claim 9 wherein said cover panel includes collapsible legs mounted to one side thereof whereby said cover panel, when disengaged from said half-shells, comprises a bench.

11. A self-contained tent assembly comprising:
first and second half-shells hinged together at their respective inner ends and capable of folding together in mating relation for defining an enclosure and extendable into aligned relation for defining a planar platform;
a flexible sheet attached to the peripheries of said half-shells, said sheet being shaped and dimensioned to fold within said half-shells when same are mated for defining an enclosed space above said platform when said half-shells are extended;
support means attached to said half-shells for folding within said half-shells when same are mated and for supporting said sheet above said platform when said half-shells are extended,
each of said half-shells including a pair of side walls, the inner ends of the sidewalls of one half-shell abutting the inner ends of the side walls of the other half-shell when said half-shells are extended for defining a pair of composite side walls extending the length of said platform, said half-shells being connected by hinges joining the tops of the abutting inner ends of the side walls;
and including a pair of fixed end walls spanning the ends of said side walls opposite from the hinged ends thereof, and including a cover panel and means for removably mounting same over the hinged ends of said half-shells when same are folded to define an enclosure.

12. The tent assembly according to claim 11 wherein said flexible sheet has an inclined portion which defines a screened opening, and including troughdefining flap attached to said flexible sheet along the lower edge of said opening whereby a watershed is provided to drain any water entering the tent assembly through said screened opening.

13. The tent assembly according to claim 11 wherein said flexible sheet defines an entryway when erected and said support means include an inverted U-shaped rod pivotally mounted at the extremities thereof to one of said half-shells and being pivotal from a position lying within one of said half-shells to a position supporting said entryway in a position inclined and overhanging said one half-shell to minimize the entry of rain through said entryway.

14. The tent assembly of claim 11 wherein said first half-shell include means for mounting same to the roof of a motor vehicle, and
said hinges and said sheet define support means for cantilevered support of said second half-shell when said half-shells are extended.

15. The tent assembly according to claim 11 wherein said half-shells include walls which completely surround said platform when said half-shells are extended, and including an impermeable resilient flap including means sealingly mounted along the edges of said walls and said flap being inwardly biased, said sheet being attached to the inner edge of said flap whereby upon folding said half-shells into mating relation, said flexible sheet will be inwardly biased by said flap to fall within said sidewalls.

16. The tent assembly according to claim 15 wherein said flexible sheet is removably attached to said flap.

17. Structure according to claim 11 wherein said first half-shell has means attached thereto for mounting same to the roof of a motor vehicle.

18. Structure according to claim 17 and including a ladder attachable in depending relation to said first half-shell, said ladder having a pair of collapsible support legs to support said ladder against the side of a vehicle and being of dimensions sufficiently small to be enclosable in said half-shells when same are mated.

19. Structure according to claim 17 wherein said means for attaching said first half-shell to the roof of a vehicle comprises a pair of parallel inverted channel members slideably engageable on a pair of rails mounted on the top of a vehicle, and including releasable locking means to fixing said channels against sliding on said rails.

20. Structure according to claim 17 and including a support brace externally hinged to said second half-shell and being extendable and lockable in an extended position to support said second half-shell above the ground.

21. Structure according to claim 20 wherein said support brace is telescoping such that upon extending said same beyond the perimeter of said second half-shell, said brace can be used as a lever to open said half-shells.

22. Structure according to claim 20 wherein said support brace is removable from said second half-shell.

* * * * *